United States Patent
Saito et al.

[11] Patent Number: 5,975,262
[45] Date of Patent: Nov. 2, 1999

[54] LOCK-UP CLUTCH CONTROL APPARATUS

[75] Inventors: Yoshiharu Saito; Yasushi Inagawa; Masamitsu Fukuchi, all of Wako, Japan

[73] Assignee: Honda Giken Kogyo Kabushiki Kaisha, Tokyo, Japan

[21] Appl. No.: 09/160,035

[22] Filed: Sep. 25, 1998

[30] Foreign Application Priority Data

Sep. 29, 1997 [JP] Japan .................................. 9-264587

[51] Int. Cl.$^6$ .................................................. F16H 45/02
[52] U.S. Cl. ...................... 192/3.31; 192/3.58; 477/63; 477/65
[58] Field of Search ................................ 192/3.28, 3.29, 192/3.3, 3.31, 3.58, 103 R; 477/62, 63, 64, 65; 74/730.1, 731.1, 732.1, 733.1

[56] References Cited

U.S. PATENT DOCUMENTS

| | | | |
|---|---|---|---|
| 4,431,095 | 2/1984 | Suga | 192/3.31 |
| 4,582,182 | 4/1986 | Takeda et al. | 192/3.31 |

*Primary Examiner*—Richard M. Lorence
*Attorney, Agent, or Firm*—Armstrong, Westerman, Hattori, McLeland & Naughton

[57] ABSTRACT

In order to improve the fuel consumption by maintaining the lock-up clutch as tightly as possible during the down-shift operation, a lock-up clutch control apparatus is provided. The lock-up clutch control apparatus comprises a revolution control device for predicting the number of revolutions of the an input axis of transmission and the number of revolutions of an engine after the speed change before a down-shift operation; a torque converter judgement device for judging the state of the torque converter in terms of whether or not a torque ratio of the torque converter will be in the torque amplification range when the lock-up clutch is turned off, from the number of revolution of the input axis of the transmission and the engine speed obtained by the revolution prediction device; and a control device for turning off the lock-up clutch, if the lock-up clutch before the speed change is in a tight condition, in the case when the judgement device judges that the torque converter will be in the torque amplification range when the lock-up clutch is turned off.

1 Claim, 7 Drawing Sheets

LOCK-UP CLUTCH CONTROL APPARATUS

BACKGROUND OF THE INVENTION

1. Field of the Invention

The present invention relates to a lock-up clutch control apparatus for controlling a engaging force of a lock-up clutch which transmits an output power of an engine to an input axis of the transmission while distributing the output power transmission with a torque converter.

This application is based on Patent Application No. Hei 9-264587 filed in Japan, the content of which is incorporated herein by reference.

2. Background Art

An example of the lock-up clutch control apparatus for transmitting the output power of the engine to the input axis of the transmission while distributing the output power transmission with the torque converter is disclosed in, for example, Japanese Patent Application, First Publication No. Hei 7-332479. Conventionally, this type of lock-up clutch control apparatus is designed such that, during speed shifting of the transmission, the lock-up clutch is turned off (wherein, the engaging force is zero) irrespective of conditions of the clutch before gear-shifting, so that the output of the engine is transmitted to the input axis of the transmission only by the torque converter.

It is preferable to make the lock-up clutch as tight as possible (maximize the engaging force) from the point of view of improving the fuel consumption.

The present invention is directed to the execution of speed shifting while maintaining the lock-up clutch in a tight condition, when the lockup clutch is in a tight condition before the gearshift.

When the gearshift is executed while maintaining the lock-up clutch in a tight condition, it is only necessary to shift the gear ratio. However, when a driver desires to increase a car speed by a down-shift operation, it is preferable to realize a state so as to be able to transmit as possible much amounts of an engine torque to the wheel side after the down-shift operation is completed.

It is therefore the object of the present invention to provide a lock-up clutch control apparatus which enables transmitting a larger amount of torque to the wheel side after the down-shifting operation, in order to improve the fuel economy by reducing fuel consumption by maintaining the lock-up clutch as tightly as possible during the down-shifting operation.

SUMMARY OF THE INVENTION

In order to achieve the hereinabove described objectives, a lock-up clutch control apparatus according to the present invention controls a engaging force of a lock-up clutch for transmitting an output power of an engine to an input axis of the transmission and also to the torque converter, the lock-up control apparatus comprises:

a revolution prediction means for predicting the number of revolutions of an input axis of a transmission and the number of revolutions of an engine after a speed change, prior to a down-shift operation;

a torque converter judgement means for judging the state of the torque converter in terms of whether or not a torque ratio of the torque converter will be in the torque amplification range when the lock-up clutch is turned off, from the number of revolutions of the input axis of the transmission and the number of revolutions of the engine obtained by said revolution prediction means;

a control means for turning off the lock-up clutch, if the lock-up clutch before the speed change is in a tight condition, in the case when said judgement means judges that the torque ratio of the torque converter will be in the torque amplification range when the lock-up clutch is turned off.

Thereby, the present lock-up clutch control apparatus is capable of executing the following operations:

a revolution prediction means predicts the number of revolutions of an input axis of transmission and the number of revolutions of an engine after the speed change before the down-shift operation;

a torque converter judgement means judges the state of the torque converter in terms of whether or not a torque ratio of the torque converter will be in the torque amplification range when the lock-up clutch is turned off, from the number of revolution of the input axis of the transmission and the number of revolutions of the engine obtained by said revolution prediction means; and a control means turns off the lock-up clutch, if the lock-up clutch before the speed change is in a tight condition, in the case when said judgement means judges that the torque converter will be in the torque amplification range when the lock-up clutch is turned off.

DESCRIPTION OF PREFERRED EMBODIMENTS

An embodiment of the lock-up clutch control apparatus according to the present invention is described hereinafter referring to attached drawings.

Figure 1:
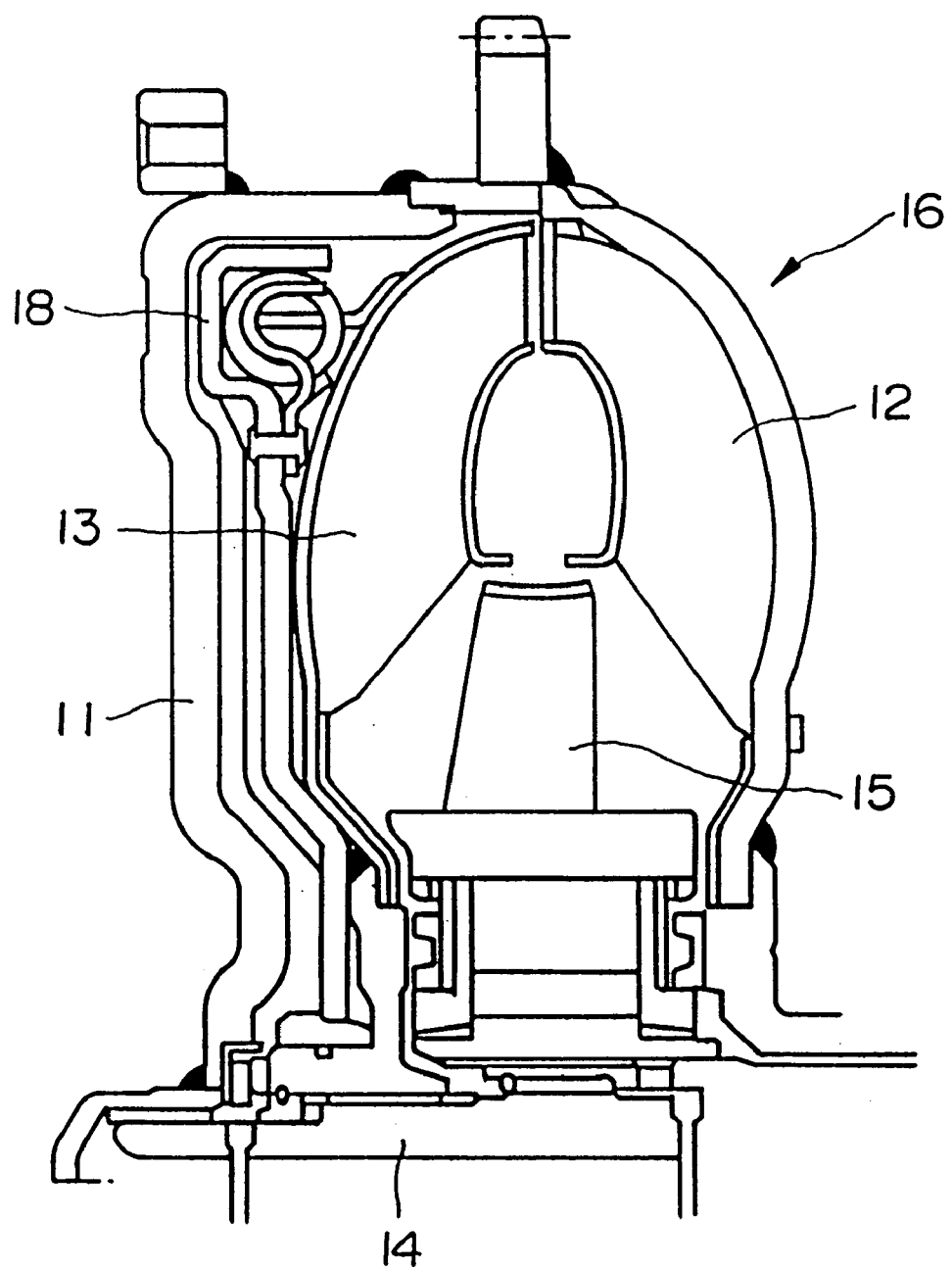
FIG. 1 shows a lock-up clutch and a torque converter controlled by a lock-up clutch control apparatus according to one embodiment of the present invention.

Referring to FIG. 1, a reference numeral 11 indicates a cover connected to a crank shaft (not shown) which is an output axis of the engine, a reference numeral 12 indicates a pump-impeller which is fixed at the cover 11 and which is united with the cover 11 to be rotated together by the driving power of the engine. A reference numeral 13 indicates a turbine-runner, a reference numeral 14 a transmission input axis fixed at the turbine-runner 13, and a reference numeral 15 indicates a stator disposed insides of the pump-impeller 12 and the turbine-runner 13. Furthermore, a torque converter 16 is composed of the pump-impeller 12, the turbine-runner 13, and the stator 15.

The lock-up clutch shown by the reference numeral 18 in FIG. 1 is a component to transmit the engine output to the input axis 14 side by distributing the transmission of the output power of the engine between the torque converter 16. The lock-up clutch 18 is disposed between the cover 11 and the turbine runner 13 and is fixed with the input axis 14 of the transmission. The lock-up clutch 18 is brought into contact or is separated from the cover 11 depending upon a fluid-pressure difference caused on both sides of the lock-up clutch, that is, the cover 11 side and the turbine runner 13 side.

When the lock-up clutch 18 is brought into contact with the cover 11 and to be fixed with the cover 11 (hereinafter, this fixed condition is called "tight"), it is possible to transmit the driving power inputted from the engine directly to the input axis 14 of the transmission without passing through the torque converter 16. While, when the lock-up clutch 18 is completely separated from the cover 11 (hereinafter, this condition is called "off"), the driving power inputted by the engine is transmitted to the pump-impeller 12 and the full speed movement of the fluid due to rotation of said pump-impeller 12 causes the turbine runner 13 to rotate; thereby the engine power is transmitted to the input axis 14 of the transmission by rotation of the turbine runner 13 (that is, through the torque converter 16).

In addition, controlling the degree of contact with the cover 11, that is, the engaging force of the lock-up clutch 18 by control of the above fluid pressure difference, distribution of the amount of the driving power to be directly transmitted through the lock-up clutch 18 and the amount of the driving power to be transmitted through the torque converter 16 is controlled.

Figure 2:
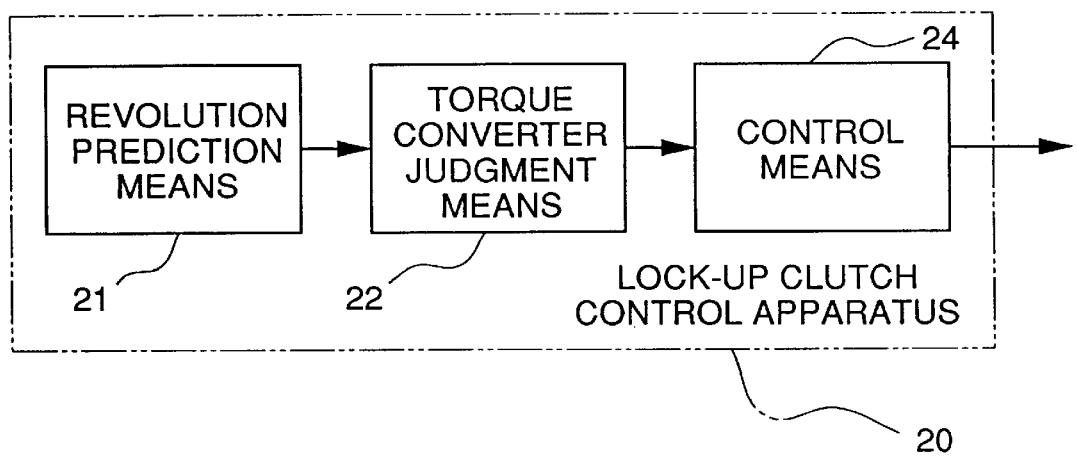
FIG. 2 is a block diagram showing a construction of one embodiment of the lock-up clutch control apparatuses according of the present invention.

The lock-up clutch control apparatus 20 is designed so as to control the engaging force of the lock-up clutch against the cover 11 by controlling the pressure difference by electrically controlling a duty-solenoid (not shown) . As shown in FIG. 2, the lock-up clutch control apparatus 20 comprises a revolution prediction means 21, a torque converter judgement means 22 and a control means 24.

The revolution prediction means 21 is used for predicting, at the beginning of a down-shift operation, the number of revolution of the input axis of the transmission and the number of revolution of the engine after a shift down operation (for example, the 4th gear to the 3rd gear). The revolution prediction means 21 calculates the number of revolution of the input axis after the down-shift operation based on a change of the gear ratio from the number of revolutions of the input axis at the beginning of the down-shift operation and also calculates the number of revolutions of the engine from the revolution of the engine (that is, the engine speed) at the beginning of the down-shift operation based on a gear ratio at the beginning of the down-shift operation.

The torque converter judgement means 22 judges, from the predicted numbers of revolution of the input axis and the engine obtained by the revolution prediction means, the state of the torque converter after the down-shift operation in terms of whether or not the torque ratio of the torque converter 16 is in the torque amplification range, when the lock-up clutch is turned off, by use of, for example, a map. Here, the torque amplification range means a region in which the torque ratio (an output torque/an input torque) is higher than 1.

Figure 3:
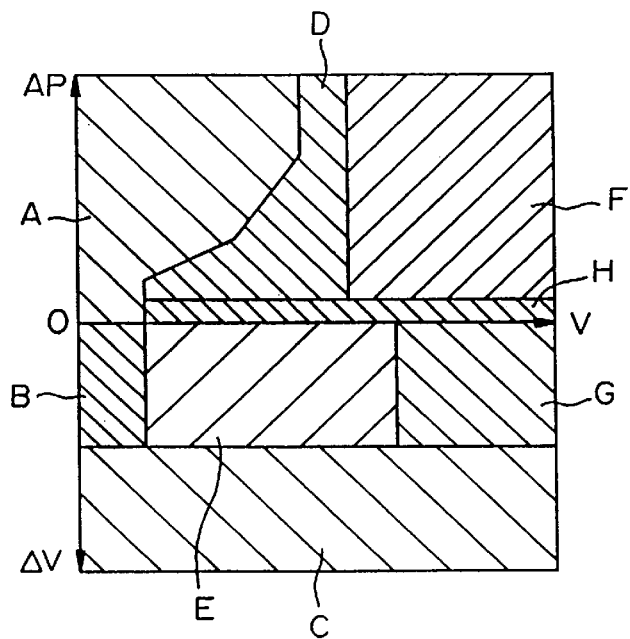
FIG. 3 is a diagram showing respective control regions of an embodiment of the lock-up clutch control apparatus according to the present invention.

As shown in FIG. 3, the control means 24 controls the lock-up clutch based essentially on the relationship between the car speed V (the horizontal axis) and the accelerating pedal opening AP (applied for a region where the value of the vertical axis is higher than 0) or the reduced speed ΔV at the time of speed reduction (applied for a region where the value of the vertical axis is lower than 0). In regions designated by reference marks A, B, and C which correspond to off regions, the lock-up clutch is turned off; in regions designated by D and E which correspond to control regions of the lock-up clutch, the lock-up clutch is feed-back controlled to obtain the target slip ratio; in regions designated by marks F and G, which correspond to tight regions, the lock-up clutch is made tight; and in a region designated by H, which corresponds to a switching region to accelerate or to reduce the car speed, the lock-up clutch is controlled so as to reduce the engaging force to prepare for switching. In addition, it is also possible to control the lock up clutch based on the relationship between the car speed V and an engine load such as a throttle opening besides the accelerating pedal opening AP.

Moreover, taking preference over those controls, the control means 24 controls the duty solenoid (not shown) so as to turn off the lock up clutch 18 during speed change and to maintain the lock up clutch 18 in the off condition until the speed change is completed, if the lock up clutch is in a tight condition, when conditions for the speed change are satisfactory; the speed change is judged to be the shift down; and in the case that the torque converter judgement means 22 determines that the condition of the torque converter after the speed change is in the torque amplification region when the lock up clutch 18 is turned off.

In contrast, when conditions for the speed change are satisfactory; the speed change is judged to be the shift down; and in the case that the torque converter judgement means 22 determines that the torque ratio of the torque converter 16 after the speed change will not be in the torque amplification range when the lock up clutch 18 is turned off and if the lock-up clutch before the down-shift is in a tight condition; the control means 24 controls the duty solenoid (not shown) so as not to turn off the lock up clutch 18 and maintain the lock up clutch in a tight condition until the speed change is completed.

After the completion of the speed change, the control of the lock up clutch 18 is executed by a control routine which is different from that at the speed change until conditions for the next speed change is fulfilled.

Figure 4:
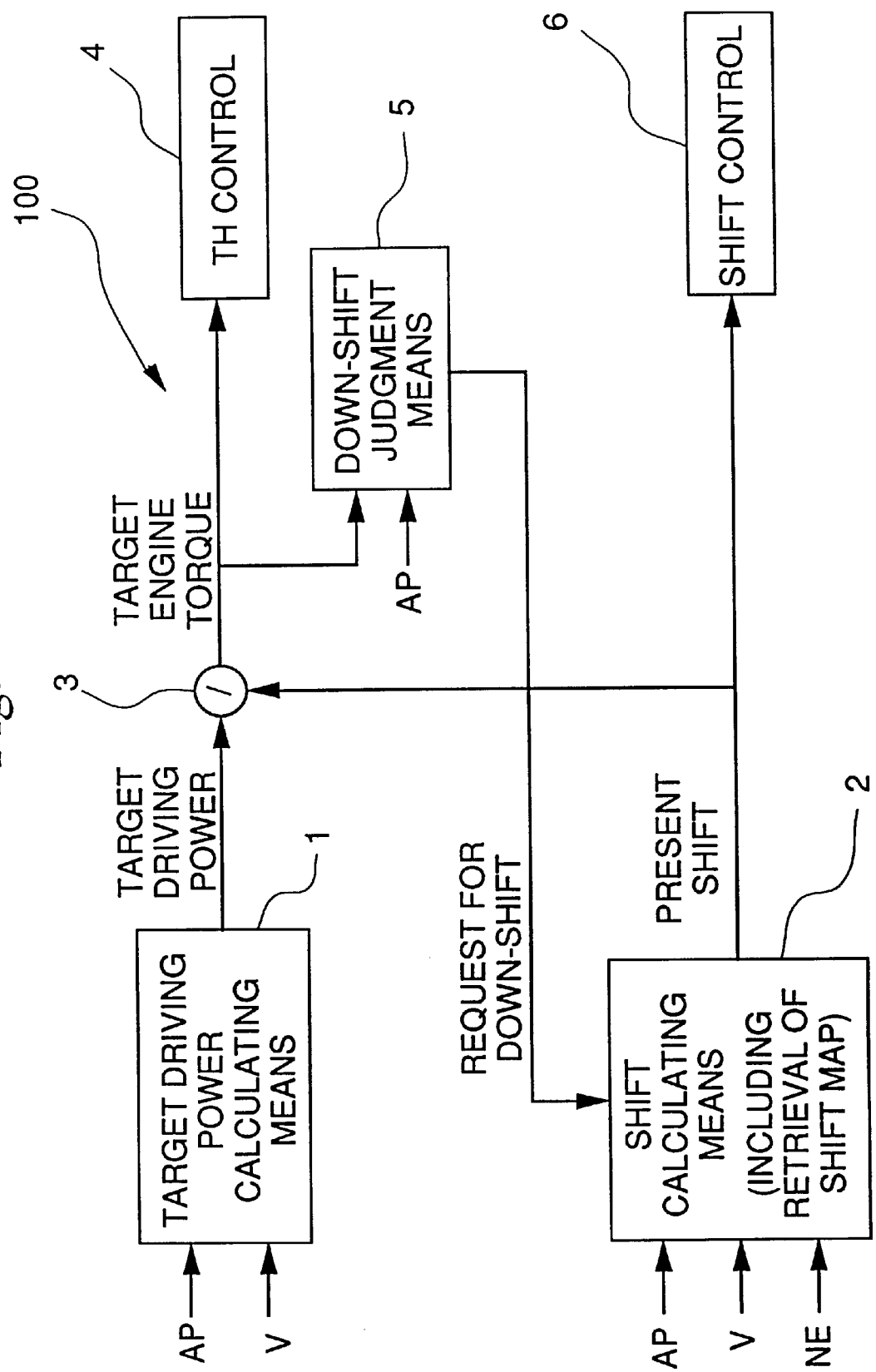
FIG. 4 is a block-diagram for outputting an instruction of a down-shift operation by a down-shift control device to one embodiment of the lock-up clutch control apparatus of the present invention.

The down-shift of the transmission is controlled and executed by a different down-shift control apparatus 100 shown in FIG. 4. The control means 24 judges commencement or the like of the down-shift by an output signal from the down-shift control apparatus 100.

Now, the down-shift operation by the down-shift control apparatus 100 will be described hereinafter.

The reference numeral 1 indicates a target power calculating means for calculating the target driving power, and the target power calculating means 1 calculates a target driving power (a torque to be generated by the engine) based on an operating amount of the accelerating pedal AP and the car speed V to meet the driver's will. That is, the target power calculating means 1 stores a map indicating the relationships between a target driving power and a car speed V at each opening of the accelerating pedal as shown in FIG. 8.

Figure 8:
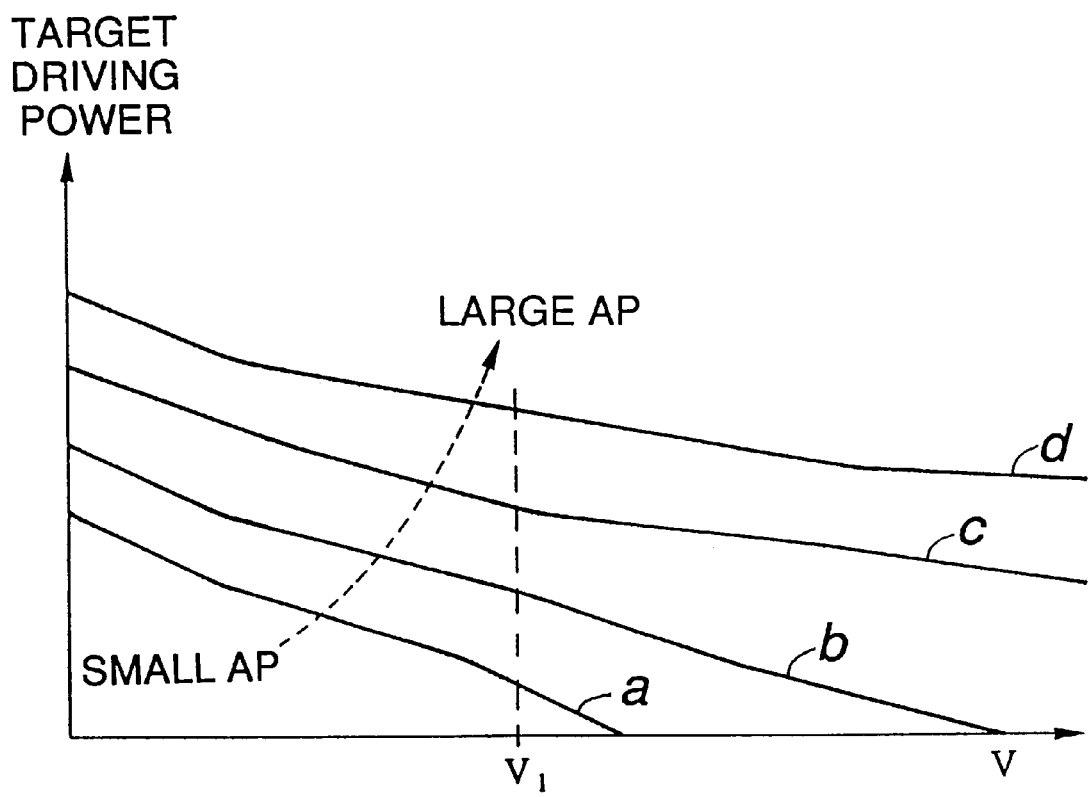
FIG. 8 is a graph showing a relationship between a target driving power, a velocity, and an opening of the accelerating pedal.

Assume that the opening of the accelerating pedal is increased in the order from a to d in FIG. 8. At a car speed of V1, if the opening of the accelerator is as small as a, it is decided that the target driving power is low, considering that the requirement for higher speed is small. At the same car speed, if the opening of the accelerating pedal is d, it is decided that the target speed is high, considering that the requirement for being accelerated into higher speed is high. The numeral 2 indicates a shift position calculating means and the shift position calculating, means 2 stores a map showing a relationship between the opening of the accelerating pedal AP, the car speed V, and the revolution of the engine Ne, and outputs a down-shift order.

Signals concerning the above target driving power and the shift position are supplied to the calculating device 3. The calculator 3 calculates the necessary target engine torque based on the above target driving power and the reduction ratio corresponding to the above shift position. The target engine torque obtained by the calculating means 3 is transmitted to the throttle control means 4, which outputs an instruction to adjust the throttle so as to yield an appropriate opening of the throttle. Furthermore, the target engine torque is supplied to the down-shift judgement means 5, so that the down-shift judgement means 5 judges whether it is necessary or not to execute down-shifting based on the opening of the accelerating pedal and the above target engine torque.

If the down-shift judgement means 5 judges it necessary to execute down-shifting, an instruction to execute down-shifting is output from the down-shift means 5 to the above shift position calculating means 2. The shift position calculating means 2 supplies to the shift control means 6 a signal about the present shift position and a signal to shift the position into the shifted position or not to shift from the present position depending upon whether the instruction is supplied or not. The shift control means 6 judges commencement of a down-shifting operation from the output of the instruction.

Figure 5:
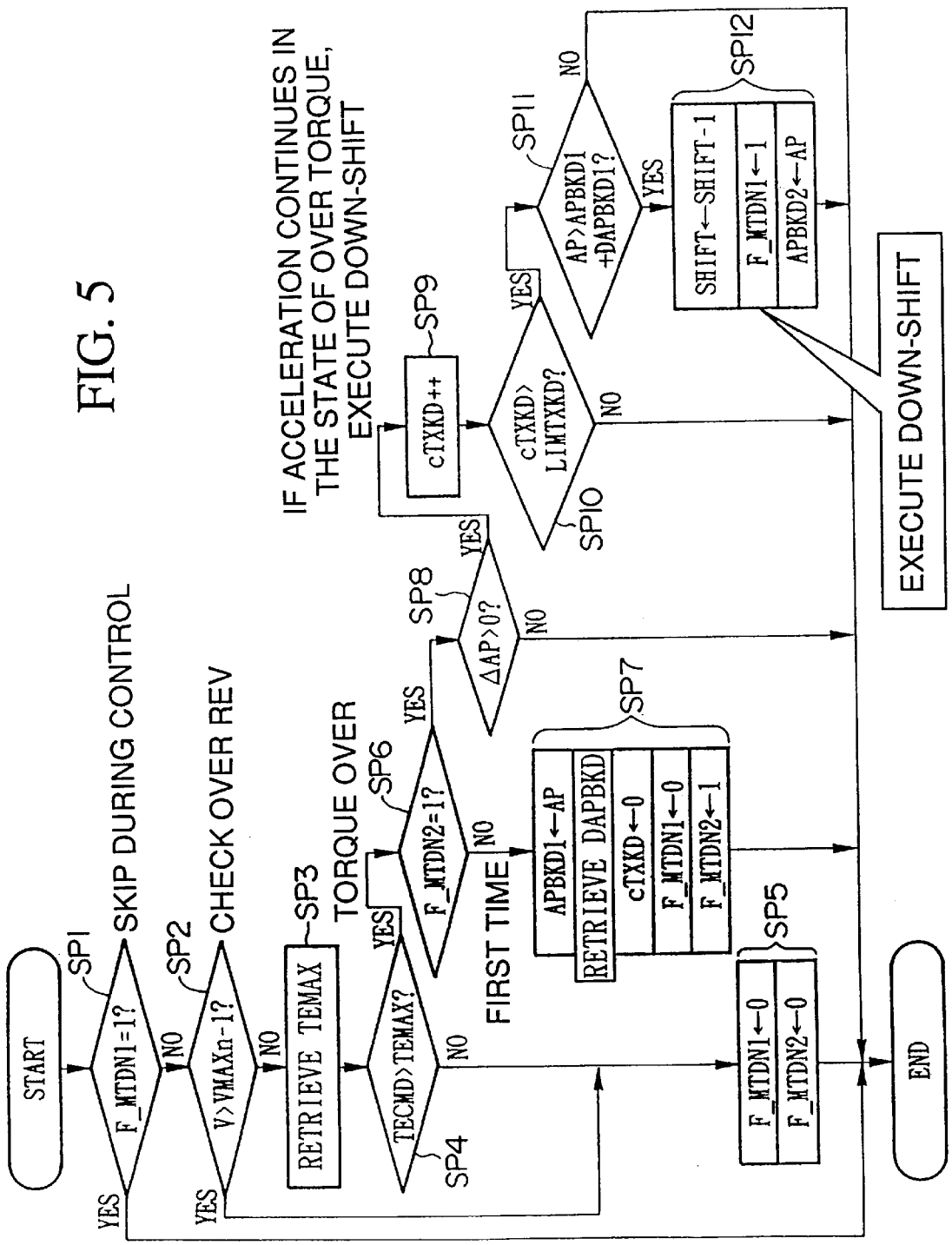
FIG. 5 shows a flow-chart of shift down execution processing by a shift down control device which outputs an instruction to shift down to one embodiment of the lock-up clutch control apparatus of the present invention.

The control operation executed by the above down-shift judgement means 5 will be described hereinafter referring to a flow-chart shown in FIG. 5.

In step SP1, the judgement means judges whether 1 (one) is set at a flag of MTDN 1 (F_MTDN1) or not, and the routine goes to the step SP2, under a condition that the result of the judgement is "NO". When the judgement is "YES", the control operation is completed. This flag of MTDN1 is used together with a flag of MTDN2 to represent at what stage the down-shift operation proceeds. A description will be given later in this specification about how setting or resetting of flags is executed under what conditions.

In step SP2, the judgement means 5 judges whether a measured car speed V at the shifted position n−1 which is lower the present position n is larger or lower than a down-shift critical car speed VMAXn−1 specified at the position n−1. When the judgement is "NO", then the routine goes to step SP3, and when the judgement is "YES", the routine goes to step SP5. The above VMAX is a pre-stored data in a specified memory area for each shift position, specified based on the mechanical performance or like of the transmission. That is, even if the judgement means judges to execute the down-shifting operation, the down-shifting is prohibited if a predicted car speed V exceeds the down-shift critical car speed VMAXn−1 so as to prevent damage of the transmission.

In step SP3, a predetermined preset value TEMAX of the engine torque corresponding to the present revolution is retrieved from a table in terms of torque characteristics which is prestored in a ROM and which indicate a relationship between the revolution of the engine Ne and the engine torque Te. This preset value TEMAX is the largest engine torque at the present shift position n, which corresponds to the engine torque when the throttle is fully opened assuming the throttle control means supplies such an instruction.

In step SP4, whether a required engine torque TECMD determined based on the opening of the accelerator pedal AP is larger than the preset value TEMAX is judged. If the target engine torque is judged to be larger than the preset value, that is, when the judgement is "YES", then the routine goes to step SP6, and if the judgement is "NO", since it means that the engine torque has sufficient room, the routine then goes to step SP5 to clear flags of MTDN1 and MTDN2.

In step SP 6, judgement of whether or not the flag of MTDN2 is set is conducted, and when the judgement is "NO", the routine goes to step SP7, and if "YES", the routine goes to step SP 8.

In step SP 7, prescribed values are substituted for following various parameters.

A measurement value AP of the opening of the accelerator pedal is substituted for the opening of the accelerator pedal APBKD1 at the time of commencing the judgement.

Threshold values DAPBKD1 (during execution) and DAPBKD2 (after released) of variations of the accelerator pedal opening $\Delta AP$, which constitutes a basis for judging the execution and the release of the down-shift control are retrieved. (In general, the higher the car speed, the larger the opening of the accelerator pedal, so that the value of DAPBKD1 also becomes large.)

A count value cTEKD of a counter, which is counted up every time when $\Delta AP$ changes in a positive direction, is reset.

Then, the flag MTCN1 is cleared, and 1 is set at the flag MTDN2.

In step SP8, a judgement is executed as to whether a variation of the accelerator pedal opening $\Delta AP$ is positive or negative, and if the judgement is "YES" then the routine goes to step SP9. If the answer is "NO", the control is completed, based on an assumption that greater speed is not intended by the driver by shifting the pedal.

In step SP9, the count cTXKD of the counter is incremented.

In step SP10, a judgement is executed as to whether or not the count value cTXKD exceeds an accumulated threshold value of the accelerator pedal opening LIMTXKD, and if the result is "YES", the routine then goes to step SPI. If the results is "NO", the control is completed, based on the assumption that the driver' intention to raise the speed is low, that is the intention to accelerate is small.

In step SP11, a comparison is carried out between a sum of threshold values of the accelerator pedal openings at the beginning of the down-shift control APBK1 and during execution of the down-shift control and the accelerator pedal opening. If the accelerator pedal opening AP is greater than the sum of the threshold values, the routine goes to step SP12. If it is smaller, the routine is completed assuming that the down-shift is not necessary. That is, the routine of the down-shift operation goes to step SP12 under a condition that the accelerator pedal opening AP has increased more than the threshold value of the accelerator pedal opening.

In step SP 12, respective parameters are set as follows to execute the down-shift operation. A value of SHIFT−1 is set for a parameter SHIFT which indicates a shift position. That is, a shift position (SHIFT−1) which is one rank lower than SHIFT is obtained by reducing one from the value of SHIFT.

A value of 1 is set at a flag MTDN1 which indicates that the down-shift operation is in execution. Consequently, the judgement at SP1 is turned into "YES" unless MTDN1 is cleared and the position is maintained at SHIFT−1, without executing the control.

The accelerator pedal opening AP during the execution of the down-shift operation is set for APBKD2.

Figure 6:
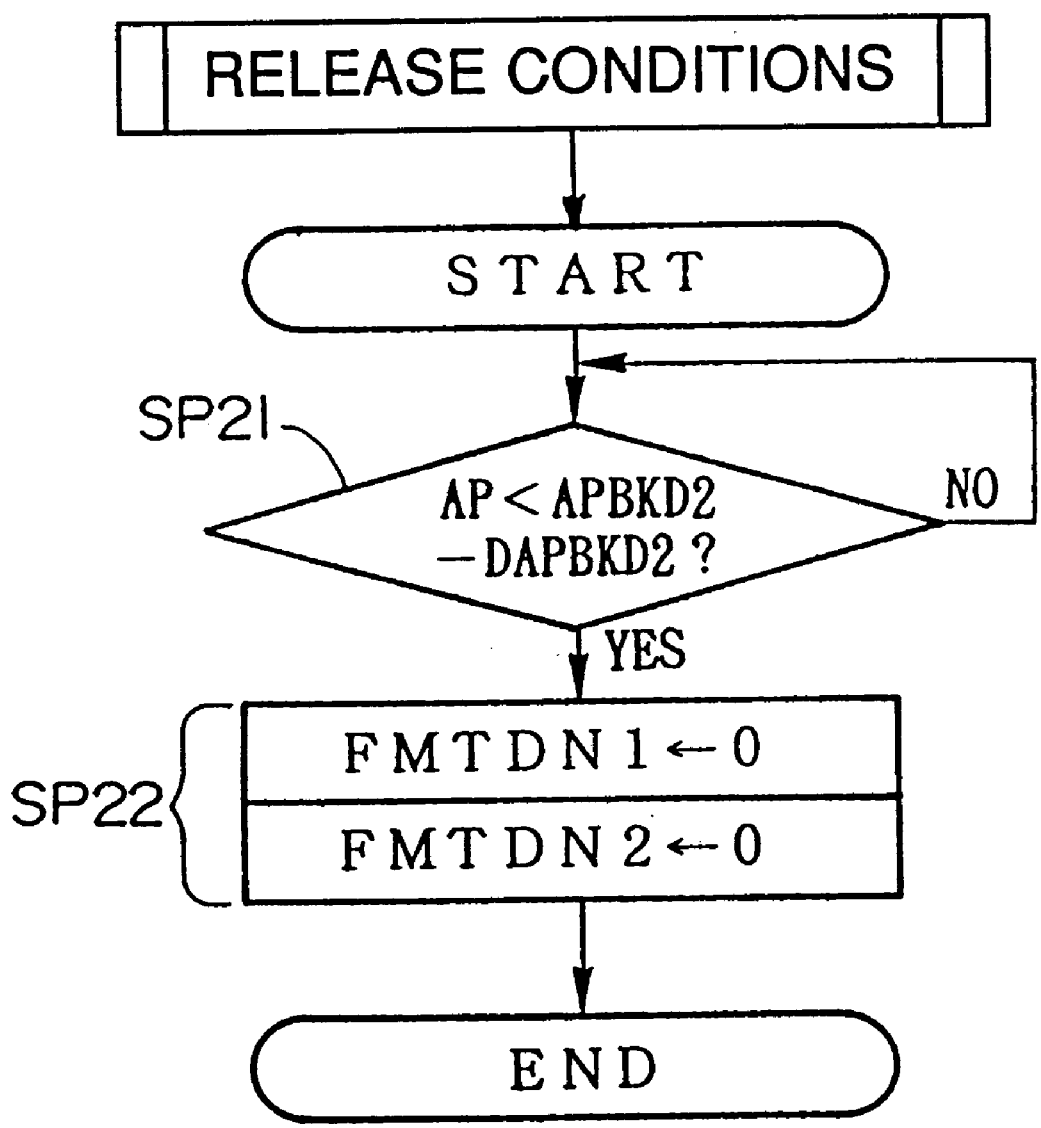
FIG. 6 shows a flow-chart of the shift down control termination processing of the shift down control device which outputs an instruction to release the shift down to one embodiment of the lock-up clutch control apparatus of the present invention.

The release operation of the shift holding is described hereinafter referring to a flow-chart shown in FIG. 6.

In step SP21, a comparison is made between the present accelerator pedal opening AP with a value which is yielded by subtracting a threshold value DAPBK2 for judging the release of the shift holding from a variation of the accelerator pedal APBKD2 for judging the release. If the accelerator pedal opening is smaller than the value obtained from the comparison, the routine goes to step SP22 and both flags of MTDN1 and MTDN2 are cleared. Consequently, the down-shift control is completed at the state in which the down-shift control is possible based on the judgement at the step SP1. That is, in the case when the accelerator pedal opening is smaller than the predetermined value, then both flags of MTDN1 and MTDN2 are cleared. Accordingly, the shift holding operation is completed under a condition so as to be able to execute the down-shift control based on the judgement of the step SP1. That is, when the accelerator pedal opening becomes lower than the predetermined value, the control operation is completed to close the summing operation, assuming that the intention for acceleration is no longer exist when the opening is not lower than the predetermined value, the judgement at the step SP21 is repeatedly performed without clearing both flags at MTDN1 and MTDN2.

Figure 7:
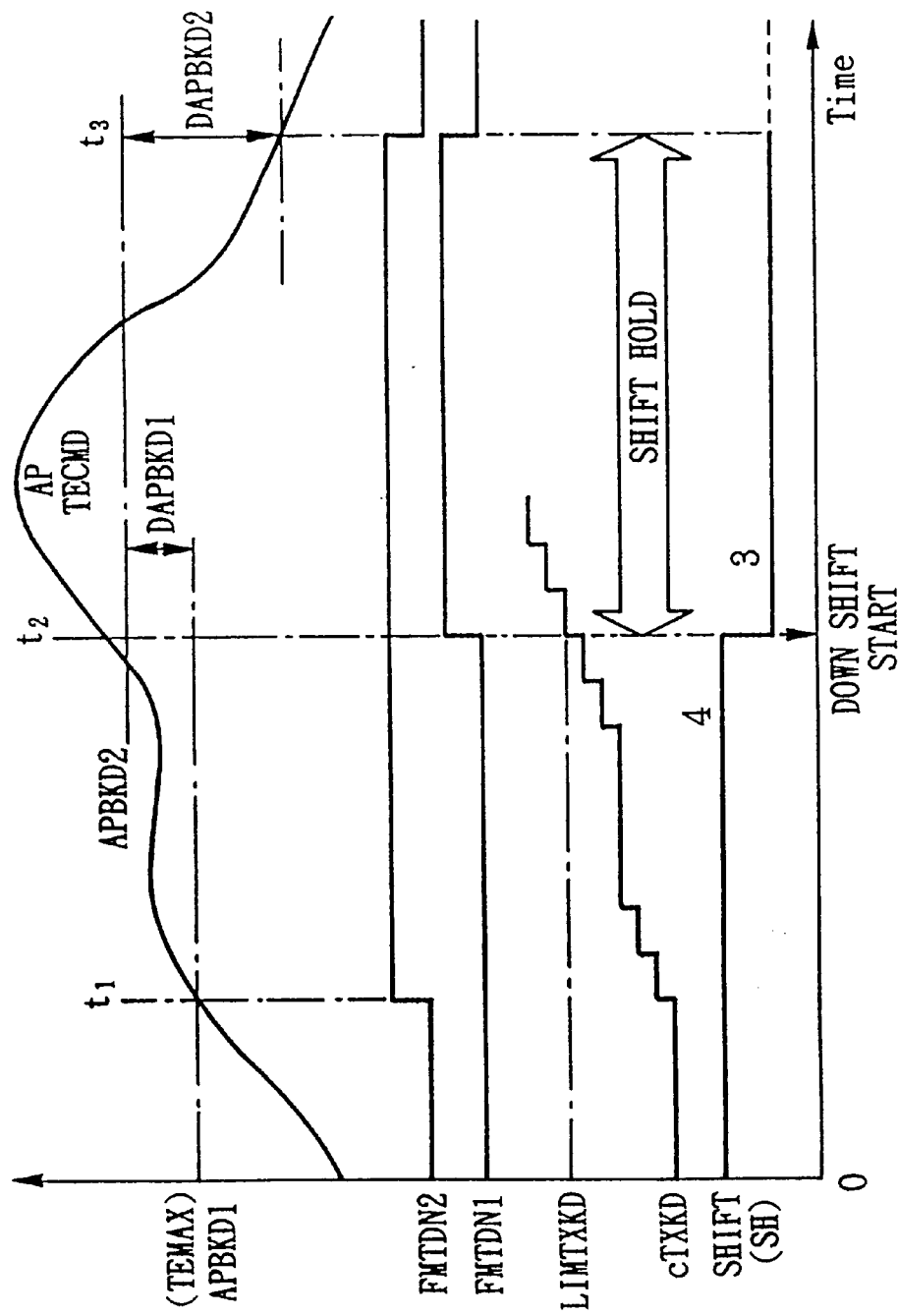
FIG. 7 is a timing chart showing timings of the shift down control of the shift down control device which outputs an instruction to shift down to one embodiment of the lock-up clutch control apparatus of the present invention.

The above control processing will be practically described referring to FIG. 7, which illustrates the variation of the accelerator pedal openings.

The accelerator pedal opening begins to increases from t=0. When the accelerator opening exceeds TEMAX at t=t1, 1 is set at the flag MTDN2 according to the operation at the step SP7. As a consequence that the flag MTDN2=1 is set, the routine goes to respective steps of SP6, SP8 and SP9, and cTXKD is incremented. That is, if the accelerator pedal opening is maintained more than a predetermined value, the cTXKD value is continuously incremented, and at t=2, it is assumed that cTXKD exceeds the estimating threshold values of the accelerator pedal opening. Such estimation of the accelerator pedal openings can be easily carried out by processing software, without using a particular apparatus. As an alternative for the above method, assuming that it is possible to decide that the accelerator pedal opening exceeds the threshold value by counting clock-pulses, by the use of counted values of the clock-pulses which corresponds to the time since the accelerator pedal was depressed. In contrast, since the cTXKD value is not counted when the driver stops depressing the pedal, the down-shift operation is not practically performed. Therefore, it is possible to perform the down-shift operation only by the driver's continuous intention for acceleration.

Furthermore, in the step SP11, if the judgement decides that the accelerator pedal opening exceeds the threshold value of the accelerator pedal opening TEMAX by more than a predetermined value of DAPBKD1 and that the down-shift operation must be executed, 1 is set at the flag MTDN1 and the down-shift operation is executed.

Thereafter, the routine is maintained under a condition of the shift-holding. Accordingly, since the engine torque does not have sufficient room and the down-shift operation is performed only when the driver's intention continues to accelerate the car, it is possible to attain the good drinkability by the shift down operation based on the driver's will, and it is also possible to avoid excessive shift operations. The judgement is given for the down-shift operation only when the driver strongly intends to accelerate the car. Furthermore, at the time t=t3, the accelerator pedal opening is reduced below the threshold value to decide the release DAPBD2, the routine goes to the step SP22 through the step SP21 to clear flags of MTDN1 and MTDN2 based on the decision at the step SP21, and the lock-up clutch control apparatus is held in the waiting condition for the next down-shift control operation.

The lock-up clutch control apparatus 20 according to this embodiment of the present invention execute the downs-shift operation when the following conditions are fulfilled. They are, when conditions for shifting are ready, and the shifting is confirmed to be down-shifting, that is, when an instruction of the down-shift operation is outputted from the down-shift judgement means 5 of the above down-shift control apparatus 100. The down-shifting operation is carried out on the basis of a prediction at the beginning of the down-shifting in terms of the input axis revolution of the transmission and the engine revolution after the down-shifting by the revolution prediction means 21, and a judgement of whether or not the state of the torque converter 16 after the down-shifting is in the torque amplification range at the time when the lock-up clutch is turned off from the input axis revolution and the engine revolution predicted by the revolution prediction means 21. The lock-up clutch 21 is turned off during shifting and maintained until the completion of the shifting operation, if the lock-up clutch is in the tight condition when the result of the judgement is that the state of the torque converter 16 is in the amplification range even if the lock-up clutch 18 is turned off.

Therefore, in order to improve the economy of the car by keeping the lock-up clutch tight during down-shifting, it becomes possible to transmit a larger amount of torque by the torque converter 16 to wheels by turning the lock-up clutch 18 off during shifting, if it is estimated that the torque converter 16 is in the amplification range when the lock-up clutch 18 is turned off. Furthermore, since the revolution prediction means 21 predicts the input axis revolution and the engine revolution after completion of the shifting operation at the beginning of the shifting operation, it is possible to turn off the lock-up clutch 18 during the shifting operation such that the shifting operation does not give any incompatible feeling to the driver.

It is clearly understood that, if the torque converter judgement means 22 judges that the torque converter will not in the amplification region when the lock-up clutch 18 is turned off, the control means 24 will not keep the lock-up clutch 18 until the completion of the shifting operation, if the lock-up clutch is in the tight condition, which results in the improvement of the car fuel economy.

In the above explanation, a shifting operation is described when the lock-up clutch 18 is in the tight condition. However, it is noted that when the lock-up clutch 18 is in the off state or in the slip state in which the lock-up clutch 18 is sliding but has some engaging force, the lock-up clutch 18 is maintained in the off state until the shifting operation is completed.

As described above in detail, the lock-up clutch control apparatus of the present invention predicts revolutions of the input axis and the engine after the speed shifting operation before the beginning of the speed shifting operation, and judges whether or not the torque converter after the speed shifting operation is in the amplification range when the lock-up clutch is turned off based on the revolutions of the input axis and the engine obtained by the above revolution prediction means; and when a judgement is obtained such that the torque converter will be in the amplification state when the lock-up clutch is in the off state, the control means turns off the lock-up clutch if the lock-up clutch is in the tight state before the speed shifting operation.

That is, when a judgement is obtained that the torque converter will be in the amplification range after the speed shifting when the lock-up clutch is turned off, the lock-up clutch is turned off during the speed shifting operation so that the maximized torque can be transmitted to the car wheels, in order to improve the fuel economy by maintaining the lock-up clutch in the tight condition. In addition, since the revolution prediction means predicts the revolutions of the input axis and the engine after the speed shifting before the beginning of the speed shifting operation, it is possible that the lock-up clutch is turned off during the speed shifting operation which will prevent the driver from experiencing an uneasiness.

On the other hand, the control means maintains the lock-up clutch in a tight condition without turning off the lock-up clutch when the torque converter judgement means judges that the torque converter will not be in the amplification range if the lock-up clutch is turned off. This also improves the fuel economy of the car.

What is claimed is:

1. A lock-up clutch control apparatus for controlling a engaging force of a lock-up clutch which transmit the output power of an engine by distributing the output power of the engine into a torque converter, the lock-up control apparatus comprises:

a revolution prediction means for predicting the number of revolution of an input axis of transmission and the number of revolutions of an engine after a speed change, prior to a down-shift operation;

a torque converter judgement means for judging the state of the torque converter in terms of whether or not a torque ratio of the torque converter will be in the torque amplification range when the lock-up clutch is turned off, from the number of revolutions of the input axis of the transmission and the number of revolutions of the engine obtained by said revolution prediction means; and a control means for turning off the lock-up clutch, if the lock-up clutch before the speed change is in a tight condition, in the case when said judgement means judges that the torque converter will be in the torque amplification range when the lock-up clutch is turned off.

* * * * *